US008917382B2

(12) United States Patent
Hayashi et al.

(10) Patent No.: US 8,917,382 B2
(45) Date of Patent: Dec. 23, 2014

(54) ELECTRIC DISTANCE METER

(75) Inventors: Kunihiro Hayashi, Itabashi-ku (JP); Ikuo Ishinabe, Itabashi-ku (JP)

(73) Assignee: Kabushiki Kaisha Topcon, Tokyo (JP)

( * ) Notice: Subject to any disclaimer, the term of this patent is extended or adjusted under 35 U.S.C. 154(b) by 658 days.

(21) Appl. No.: 13/122,200

(22) PCT Filed: Sep. 24, 2009

(86) PCT No.: PCT/JP2009/066495
§ 371 (c)(1),
(2), (4) Date: May 10, 2011

(87) PCT Pub. No.: WO2010/038645
PCT Pub. Date: Apr. 8, 2010

(65) Prior Publication Data
US 2011/0216305 A1 Sep. 8, 2011

(30) Foreign Application Priority Data
Oct. 3, 2008 (JP) ................................. 2008-258732

(51) Int. Cl.
G01C 3/08 (2006.01)
G01S 7/481 (2006.01)
G01S 17/08 (2006.01)

(52) U.S. Cl.
CPC ............. G01S 7/4813 (2013.01); G01S 7/4818 (2013.01); G01S 17/08 (2013.01)
USPC .......................... 356/5.01; 356/3.01; 356/4.01

(58) Field of Classification Search
USPC .............. 356/3.01–3.16, 4.01–4.1, 5.01–5.15
See application file for complete search history.

(56) References Cited

U.S. PATENT DOCUMENTS 3,547,526 A * 12/1970 Devereux ...................... 359/729
5,923,468 A * 7/1999 Tsuda et al. ................... 359/426
(Continued)

FOREIGN PATENT DOCUMENTS

| JP | 7-168122 | 7/1995 |
| JP | 2004-69611 | 3/2004 |
| JP | 2006-308441 | 9/2006 |

OTHER PUBLICATIONS

International Search Report issued Oct. 20, 2009 in International (PCT) Application No. PCT/JP2009/066495.

(Continued)

*Primary Examiner* — Isam Alsomiri
*Assistant Examiner* — Assres H Woldemaryam
(74) *Attorney, Agent, or Firm* — Wenderoth, Lind & Ponack, L.L.P.

(57) ABSTRACT

An electric distance meter is downsized by using a condensing optical member having a small outer diameter (effective diameter) as a condensing optical member in a light-receiving optical system, reducing a focal length of the condensing optical member without reducing a spread angle to a light-receiving optical fiber and reducing a diameter of the light-receiving optical fiber. An optical distance meter emits outgoing light from a light source to an object, and receives reflection light R from the object by a light receiver, so as to perform distance measurement. The optical distance meter includes an emitting optical system which irradiates the object by the emission light via an objective lens and a light-receiving optical system which guides the reflection light via the objective lens to the light receiver, and a cone prism which changes a cross-section shape of a light beam without generating a transmission deflection angle is provided.

9 Claims, 6 Drawing Sheets

(56) References Cited

U.S. PATENT DOCUMENTS

| | | | |
|---|---|---|---|
| 6,428,171 B1 * | 8/2002 | Aoki et al. | 356/634 |
| 6,710,885 B2 * | 3/2004 | Ohishi et al. | 356/614 |
| 6,765,653 B2 * | 7/2004 | Shirai et al. | 356/4.01 |
| 6,894,767 B2 * | 5/2005 | Ishinabe et al. | 356/5.01 |
| 7,382,443 B2 * | 6/2008 | Ohtomo et al. | 356/4.01 |
| 8,040,529 B2 * | 10/2011 | Okuda et al. | 356/614 |
| 2004/0027554 A1 * | 2/2004 | Ishinabe et al. | 356/5.1 |
| 2008/0266576 A1 * | 10/2008 | Iwamoto | 356/614 |

OTHER PUBLICATIONS

Japanese Office Action issued Dec. 13, 2013, in corresponding Application No. 2008-258732.

* cited by examiner

ELECTRIC DISTANCE METER

The present application is based on and claims priority from Japanese Patent Application No. 2008-258732, filed on Oct. 3, 2008, the disclosure of which is hereby incorporated by reference in its entirety.

TECHNICAL FIELD

The present invention relates to an electric distance meter which measures a distance by using light, in particular, to an electric distance meter which irradiates an object on an outgoing optical axis by outgoing light via an objective lens, and obtains reflection light on the outgoing optical axis via the objective lens.

BACKGROUND ART

An electric distance measuring method, which measures a distance based on outgoing light toward an object and reflection light of the outgoing light by the object received by a light receiver, is known in surveying with public works, for example. In an electric distance meter which performs such a method, the same objective lens is used in the outgoing optical path to the object and the reflection optical path from the object (for example, refer to Japanese Unexamined Patent Application Publication No. 2004-69611). In such an electric distance meter, in the optical path passing through the objective lens facing the object, the central area including the optical axis is used as the outgoing optical path and the circumferential area thereof is used as the reflection optical path.

However, in the above electric distance meter, the reflection optical path is set in the circumferential area, so that it is necessary for the reflection light via the reflection optical path not to have a light beam in the central portion. A condensing lens (condensing optical member) for receiving reflection light by a light receiver is generally used in an electric distance meter. Accordingly, it is necessary to use a condensing lens having a large diameter (effective diameter) relative to a large-outer diameter reflection light without having a light beam in the central portion, so that it becomes difficult to downsize the electric distance meter.

Moreover, the electric distance meter can be downsized by reducing the distance between the condensing lens and the light receiver. In this case, in order to reduce the distance between the condensing lens and the light receiver, i.e., in order to reduce the focal length of the condensing lens, it is necessary to use a condensing lens having a large NA (numerical aperture stop). However, if a diameter (effective diameter) of a lens is large, it is difficult to set a large NA compared to a small diameter (effective diameter) lens, and it is difficult to reduce the focal length of the condensing lens.

It is, therefore, an object of the present invention to provide a downsized electric distance meter by using a condensing optical member having a small outer diameter (effective diameter) as a condensing optical member in a light receiving optical system of reflection light from an object, and by reducing a focal length of the condensing optical member without reducing a spread angle to a light-receiving optical fiber, so as to reduce a diameter of the light-receiving optical fiber.

BRIEF SUMMARY OF THE INVENTION

An electric distance meter of the present invention, which emits outgoing light from a light source toward an object, and measures a distance by receiving reflection light of the outgoing light from the object by a light receiver, includes an emission optical system configured to irradiate the object by the outgoing light via an objective lens, a light-receiving optical system configured to guide the reflection light to the light receiver via the objective lens, and a cone prism configured to change a cross-section shape of a light beam without generating a transmission deflection angle, the cone prism being provided on an optical path of the light-receiving optical system or an optical path of the emission optical system.

Preferably, a reflection light collimator optical member configured to convert the reflection light into a substantially parallel light beam and a condensing optical member configured to condense the reflection light via the reflection light collimator optical member are provided in an optical path from the objective lens to the light receiver, and the cone prism configured to change the cross-section shape of the light beam while reducing an outer diameter of the light beam without generating the transmission deflection angle is provided between the reflection light collimator optical member and the condensing optical member.

Preferably, the outgoing light is emitted via the objective lens on an irradiation optical axis toward the object, and the reflection light of the outgoing light from the object entered onto the object lens is received in a state without having a central portion, which circularly surrounds the outgoing light, a reflection light collimator optical member configured to convert the reflection light into a parallel light beam and a condensing optical member configured to condense the reflection light via the reflection light collimator optical member are provided in an optical path from the objective lens to the light receiver, and the cone prism configured to convert the reflection light without having a central portion, which is converted into a parallel light beam via the reflection light collimator optical member, into a parallel light beam having the central portion by changing the cross-section shape of a light beam while reducing an outer diameter of the light beam without generating a transmission deflection angle is provided between the reflection light collimator optical member and the condensing optical member.

An electric distance meter of the present invention, which measures a distance to an object, includes a light receiving and emitting mechanism configured to emit light from a light source and receive light by a light receiver, an optical path forming optical system configured to form an emission optical path which emits outgoing light from the light receiving and emitting mechanism from an objective lens on an irradiation optical axis toward the object and form a reflection optical path which guides reflection light of the outgoing light from the object entered onto the objective lens to the light receiving and emitting mechanism in a sate without having a central portion, which circularly surrounds the outgoing light, an emitting optical fiber configured to connect the light receiving and emitting mechanism and the optical path forming optical system, and guide the outgoing light emitted from the light receiving and emitting mechanism to the emission optical path of the optical path forming optical system, and a light-receiving optical fiber configured to connect the light receiving and emitting mechanism and the optical path forming optical system, and guide the reflection light via the reflection optical path of the optical path forming optical system to the light receiver of the light receiving and emitting mechanism, wherein the reflection optical path includes a reflection light collimator optical member configured to convert the reflection light into a substantially parallel light beam and a condensing optical member configured to condense the reflection light via the reflection light collimator optical member to be entered onto an incident end face of the light-receiving optical fiber, and a cone prism configured to change a cross-section shape of a light beam while reducing an outer diameter of the light beam without generating a transmission deflection angle is provided between the reflection light collimator optical member and the condensing light optical member.

Preferably, the cone prism converts the reflection light without having a central portion, which is converted into a parallel light beam via the reflection light collimator optical member, into a parallel light beam having the central portion by deflecting the reflection light without having the central portion on an optical axis side in a radial direction.

Preferably, the cone prism includes a rotationally symmetric cylindrical shape having an optical axis from the reflection light collimator optical member to the condensing optical member as a symmetrical axis, an end face located on the reflection light collimator optical member side includes a conical shape projecting toward the reflection light collimator optical member, an end face located on the condensing optical member side includes a conical shape having a concave shape to the condensing optical member, and facing portions of the end face located on the condensing optical member side and the end face located on the reflection light collimator optical member side in a radial direction with the symmetrical axis at the center are parallel.

Preferably, an outgoing light collimator optical member configured to convert the outgoing light into a substantially parallel light beam is provided in an optical path from the light source to the objective lens, and the cone prism configured to convert the outgoing light of the parallel light beam via the outgoing light collimator optical member into a parallel light beam without having a central portion by changing a cross-section shape of a light beam while increasing an outer diameter of the light beam without generating a transmission deflection angle is provided between the outgoing light collimator optical member and the objective lens.

Preferably, the outgoing light is emitted via the objective lens to circularly surround an irradiation optical axis toward the object, and the reflection light from the object entered onto the objective lens near the irradiation optical axis to be surrounded by the outgoing light is received by the light receiver, an outgoing light collimator optical member configured to convert the outgoing light into a substantially parallel light is provided in an optical path from the light source to the objective lens, and the cone prism configured to convert the outgoing light via the outgoing light collimator optical member into a parallel light beam without having a central portion by changing a cross-section shape of a light beam while increasing an outer diameter of the light beam without generating a transmission deflection angle is provided between the outgoing light collimator optical member and the objective lens.

An electric distance meter of the present invention, which measures a distance to an object, includes a light receiving and emitting mechanism configured to emit light from a light source and receive light by a light receiver, an optical path forming optical system configured to form an emission optical path which emits via the objective lens outgoing light from the light receiving and emitting mechanism to surround an irradiation optical axis toward the object, and to form a reflection optical path which guides the reflection light from the object entered onto the objective lens near the irradiation optical axis to be surrounded by the outgoing light to the light emitting and receiving mechanism, an emitting optical fiber configured to connect the light receiving and emitting optical mechanism and the optical path forming optical system and guide the outgoing light emitted from the light receiving and emitting mechanism to the emission optical path of the emission optical system, a light-receiving optical fiber configured to connect the light receiving and emitting optical mechanism and the optical path forming optical system and guide the reflection light via the reflection optical path of the light receiving optical system to the light receiver of the light receiving and emitting mechanism, wherein the emission optical path includes an outgoing light collimator optical member configured to convert the emission light into a parallel light beam, and the cone prism configured to convert the emission light via the outgoing light collimator optical member into a parallel light beam without having a central portion by changing a cross-section shape of the light beam while increasing an outer diameter of the light beam without generating a transmission deflection angle is provided between the outgoing light collimator optical member and the objective lens.

Preferably, the cone prism is configured to convert the emission light converted into a parallel light beam via the outgoing light collimator optical member into a parallel light beam without having the central portion by deflecting in a radial direction which is the direction opposite to an optical axis.

Preferably, the cone prism includes a rotationally symmetric cylindrical shape having an optical axis from the outgoing light collimator optical member to the objective lens as a symmetrical axis, an end face located on the outgoing light collimator optical member side includes a conical shape having a concave shape to the outgoing light collimator optical member, an end face located on the objective lens side includes a conical shape projecting toward the objective lens, facing portions of the end face located on the objective lens side and the end face located on the outgoing light collimator optical member side in a radial direction with the symmetrical axis at the center are parallel.

According to the electric distance meter of the present invention, the condensing optical member in the light-receiving optical system of the reflection light from the object condenses the reflection light in which the diameter is reduced by the cone prism. For this reason, a condensing optical member having a small outer diameter (effective diameter) can be used.

According to the electric distance meter of the present invention, since a condensing lens having a small outer diameter (effective diameter) can be used as the condensing optical member in the light-receiving optical system of the reflection light from the object, compared to a conventional electric distance meter, the diameter of the light-receiving optical fiber can be reduced by decreasing the focal length of the condensing optical member without decreasing a spread angle to the light-receiving optical fiber.

Therefore, according to the electric distance meter of the present invention, the size can be easily reduced.

Hereinafter, an electric distance meter according to an embodiment of the present invention will be described with reference to the drawings.

DETAILED DESCRIPTION OF THE INVENTION

First Embodiment

Figure 1:
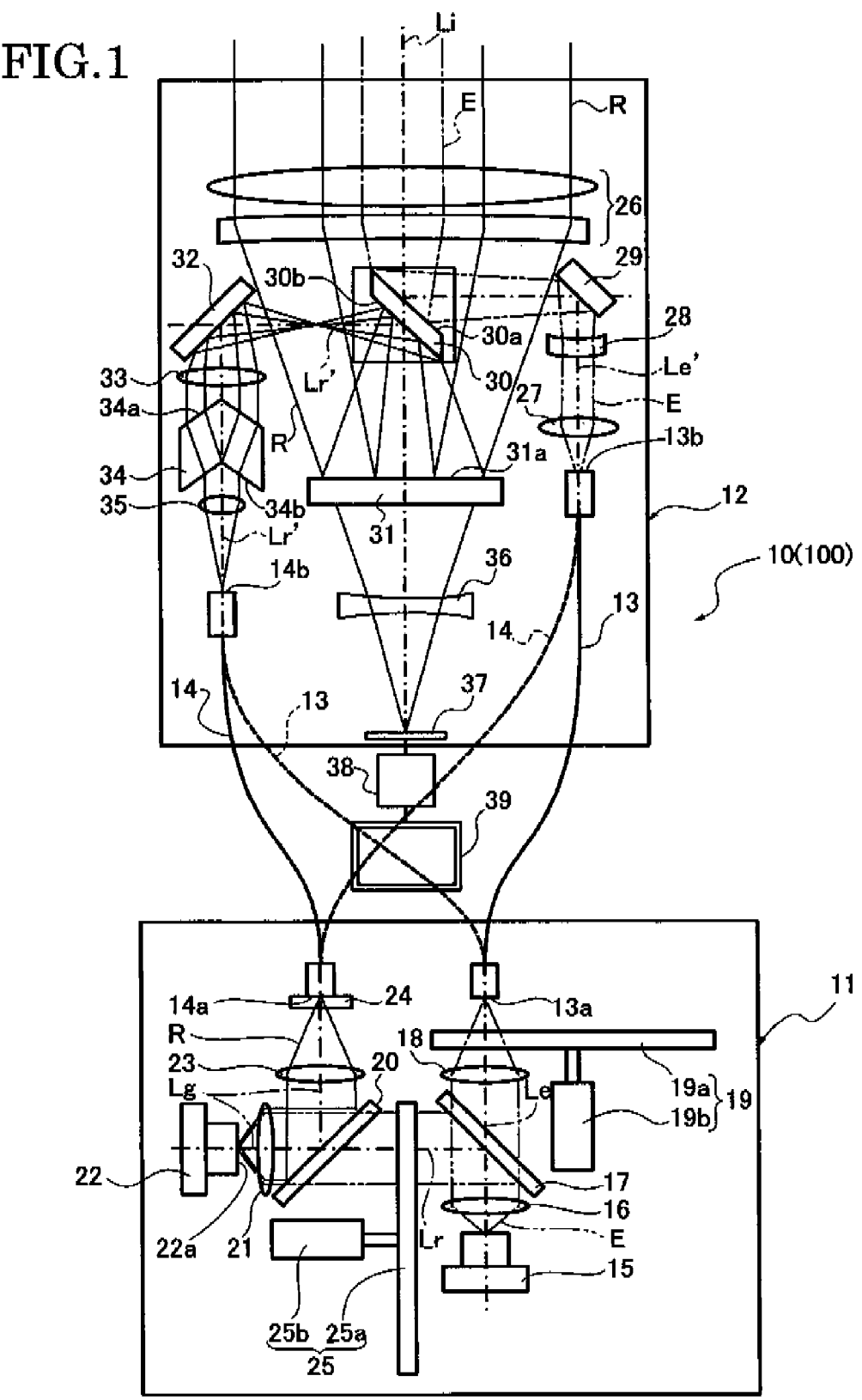
FIG. 1 is a schematic view illustrating an optical system of an electric distance meter according to the present invention.
Figure 2:
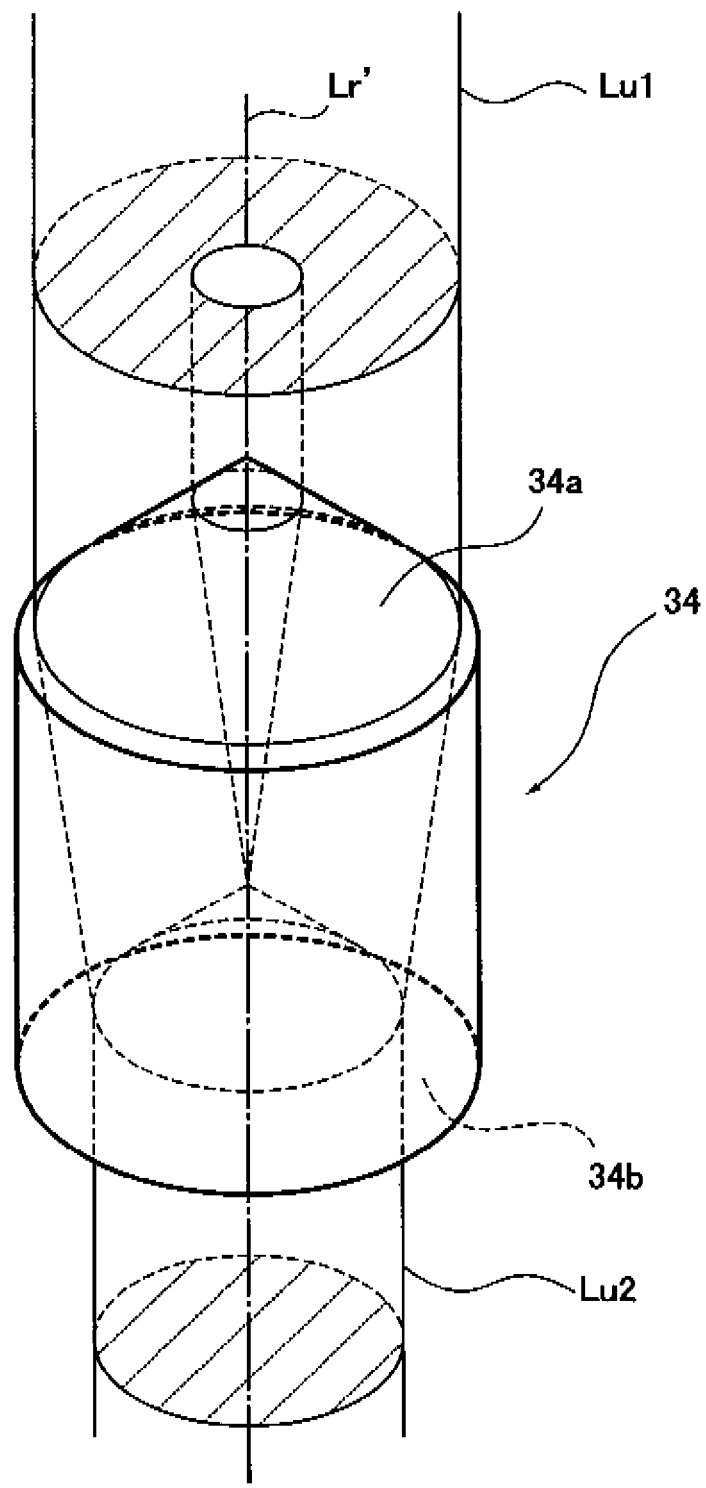
FIG. 2 is a perspective view of a cone prism describing a function of the cone prism for use in the electric distance meter.
Figure 3:
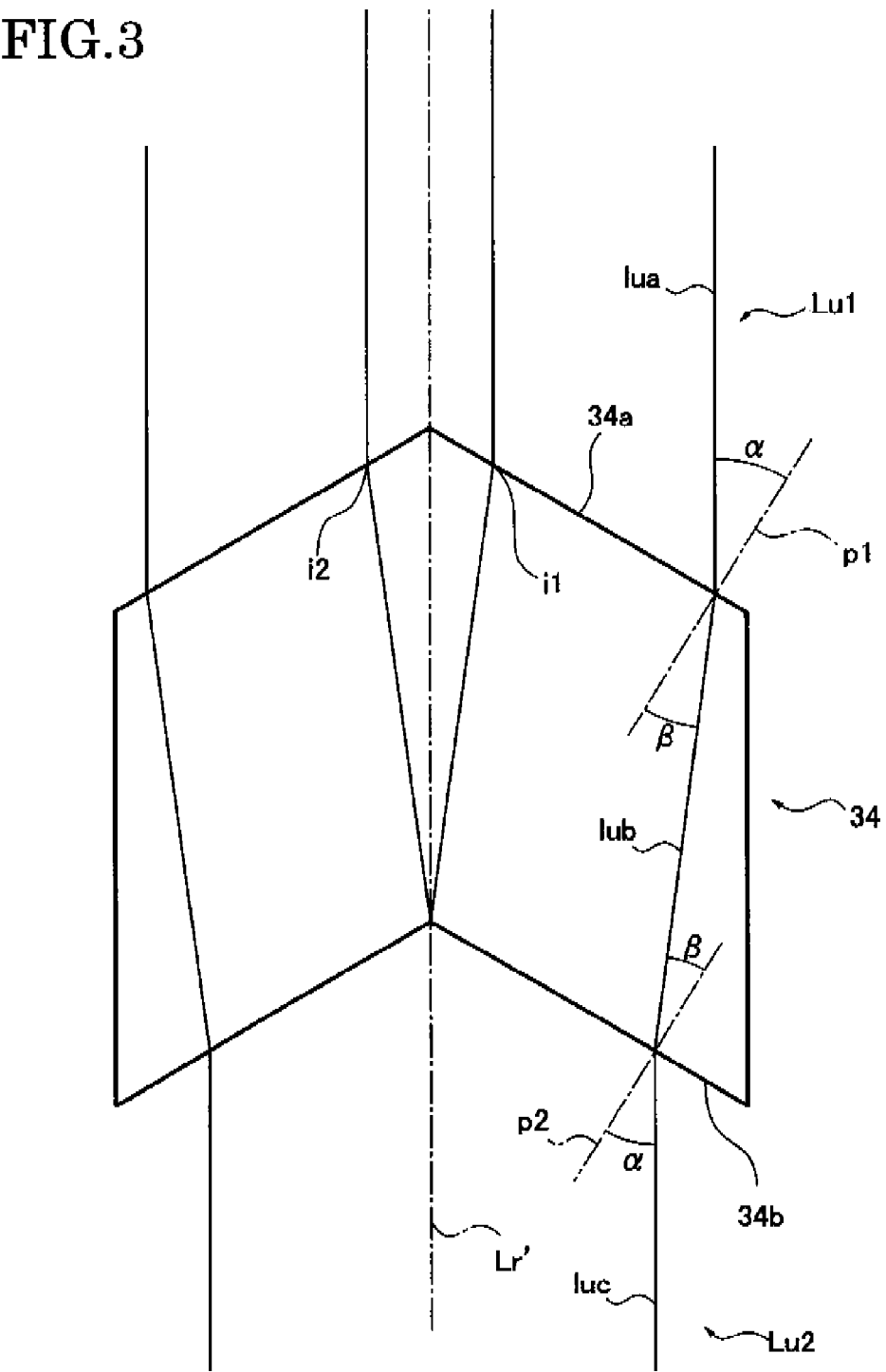
FIG. 3 is a sectional view illustrating the cone prism including an optical axis (incident optical axis) for describing the function of the cone prism.

FIG. 1 is a schematic view illustrating an optical system of an electric distance meter 10 according to the present invention. FIG. 2 is a perspective view illustrating a cone prism 34 describing functions of the cone prism 34 for use in the electric distance meter 10. FIG. 3 is a sectional view illustrating the cone prism 34 including the optical axis (reflection optical axis Lr') describing the functions of the cone prism 34.

The electric distance meter (EDM) 10 emits light (outgoing light) toward an object to be measured, receives reflection light reflected by the object and measures a phase difference and/or a time difference from the emitting of the outgoing light to the receiving of the reflection light, so as to measure a distance (not shown). In the electric distance meter 10 of the present embodiment, as illustrated in FIG. 1, a light receiving and emitting mechanism 11 and an optical path forming optical system 12 are optically connected via an emission optical fiber 13 and a light-receiving optical fiber 14.

The light receiving and emitting mechanism 11 emits outgoing light E from a light source 15, and receives the reflection light R by a light-receiving element 22 (light receiver), in order to measure the phase difference and/or the time difference from the emitting of the outgoing light E to the receiving of the reflection light R. The optical path forming optical system 12 connected to the light receiving and emitting mechanism 11 forms an emission optical path which emits the outgoing light E along an irradiation optical axis Li from an objective lens group 26 toward an object (not shown), and forms a reflection optical path which receives the reflection light R along the irradiation optical axis Li from the object via the objective lens group 26.

The light emitting and receiving mechanism 11 includes the light source 15, a first collimator lens 16, a first half mirror 17, a first condensing lens 18, and a first ND (Neutral Density) filter device 19. The light source 15 emits light in which a phase and intensity are appropriately adjusted under the control of a controller (not shown). In this embodiment, a pulse laser diode is used as the light source 15. The first collimator lens 16, the first half mirror 17, the first condensing lens 18 and the first ND filter device 19 are arranged on an outgoing optical axis Le of the light source 15.

The first collimator lens 16 converts the outgoing light E from the light source 15 into a light beam parallel to the outgoing optical axis Le. The first half mirror 17 transmits a part of the parallel light beam and reflects the remaining portion of the parallel light beam to the light-receiving element 22.

The first condensing lens 18 is provided to condense the outgoing light E which has transmitted the first half mirror 17. The first condensing lens 18 condenses the outgoing light E which has transmitted the first half mirror 17, and enters the outgoing light E onto an incident end face 13a of the emission optical fiber 13 provided on the outgoing optical axis Le. The first ND filter device 19 is provided between the incident end face 13a and the first condensing lens 18.

The ND filter device 19 includes a discoid ND filter portion 19a and a motor 19b which rotates the ND filter portion 19a. The ND filter portion 19a is a filter member in which the transmittance is gradually changed according to an angular position from a reference point. The first ND filter 19 is provided such that a part of the ND filter portion 19a is located on the outgoing optical axis Le. The light volume which enters onto the incident end face 13a of the emission optical fiber 13 is adjusted by driving the motor 19b under the control of a controller (not shown). The outgoing light E entered onto this incident end face 13a is guided to the optical path forming optical system 12 via the emission optical fiber 13, and is guided on the irradiation optical axis Li for irradiating the not shown object as described below.

The light receiving and emitting mechanism 11 includes a second half mirror 20, a second condensing lens 21 and a light-receiving element 22 in the reflection direction (on the reflection optical axis Lr) by the first half mirror 17. The light receiving and emitting mechanism 11 also includes a second collimator lens 23, a noise elimination filter 24 and an emission end face 14a of the light-receiving optical fiber 14 in the reflection direction of the second half mirror 20 to the reflection optical axis Lr as seen from the light-receiving element 22 side.

As described below, the reflection light R from the object (not shown) is guided to the light-receiving optical fiber 14 by the optical path forming optical system 12. The reflection light R is emitted from the emission end face 14a of the light-receiving optical fiber 14. The noise elimination filter 24, the second collimator lens 23, the second half mirror 20, the second condensing lens 21 and the light-receiving element 22 are provided in order to receive the reflection light R. The axis line from the emission end face 14a to the light receiving element 22 via the second half mirror 20 is a light-receiving optical axis Lg.

The second collimator lens 23 converts the reflection light R emitted from the emission end face 14a into a light beam parallel to the receiving optical axis Lg. The second half mirror 20 reflects this reflection light R toward the second condensing light 21 and transmits the remaining portion of the outgoing light E reflected by the first half mirror 17.

The second condensing lens 21 is provided to condense the reflection light R reflected by the second half mirror 20 and the outgoing light E which has transmitted the second half mirror 20. The second condensing lens 21 condenses the reflection light R and the outgoing light E such that the reflection light R and the outgoing light E enters onto the light-receiving face 22a of the light-receiving element 22.

A second ND filter device 25 is arranged between the second half mirror 20 and the first half mirror 17. This second ND filter device 25 has a configuration which is similar to that of the first ND filter device 19. The rotation position of an ND filter portion 25a is adjusted according to the driving of a motor 25b under the control of a controller (not shown), so that the volume of the outgoing light E which is reflected by the first half mirror 17 toward the light-receiving face 22a of the light-receiving element 22 is adjusted. In this second ND filter device 25, the adjustment volume is appropriately controlled according to the adjustment volume in the first ND filter device 19.

The light-receiving element 22 to which the reflection light R and the outgoing light E having the adjusted light volume are guided outputs electric signals according to the light volume if light enters onto the light-receiving face 22a. In this embodiment, an APD (Avalanche Photodiode) is used as the light-receiving element 22.

In the electric distance meter 10, by detecting a phase difference between the outgoing light E emitted from the light source 15, reflected by the first half mirror 17, and received by the light-receiving element 22 and the reflection light R received by the light-receiving element 22 via the optical path forming optical system 12 and the initial phase of the outgoing light E, or a time difference from the emitting of the outgoing light E to the receiving of the reflection light R, a not shown calculator calculates a distance from the electric distance meter 10 to the object (not shown), so as to perform distance measurement.

The optical path forming optical system 12 is optically connected to the light receiving and emitting mechanism 11 via the emission optical fiber 13 and the light-receiving optical fiber 14.

This optical path forming optical system 12 emits the outgoing light E guided by the emission optical fiber 13 along the irradiation optical axis Li, and has the objective lens group 26 on the irradiation optical path Li. The optical path forming optical system 12 includes on the outgoing optical path Le' of the emission end face 13b of the emission optical fiber 13 a third collimator lens 27, an expander lens 28 and a first mirror 29. The optical path forming optical system 12 also includes a double-sided mirror 30 in the reflection direction to the emission optical axis Le' in the first mirror 29. This double-sided mirror 30 is in the form of plates having reflection surfaces (first reflection face 30a and second reflection face 30b) on both surfaces. In this embodiment, the double-sided mirror 30 is a discoid. The first reflection face 30a is disposed on the first mirror 29 side. The double-sided mirror 30 is provided such that the reflection direction of the first reflection mirror 30a corresponds to the irradiation optical axis Li.

The third collimator lens 27 converts the outgoing light E emitted from the emission end face 13b of the emission optical fiber 13 into a light beam parallel to the outgoing optical axis Le'. The expander lens 28 converts the outgoing light E converted into the parallel light beam by the third collimator lens 27 into an increased light beam in which the beam diameter is increased. The first mirror 29 reflects the outgoing light E converted into the increased light beam by the expander lens 28 toward the first reflection face 30a of the double-sided mirror 30. This first reflection face 30a reflects the outgoing light E toward the objective lens group 26. This objective lens group 26 emits the increased outgoing light E on the irradiation optical axis Li as the light beam parallel to the irradiation optical axis Li. In this case, the diameter of the objective lens group 26 is set to be larger than the diameter of the outgoing light E.

The optical path forming optical system 12 includes a second mirror 31, a third mirror 32, a fourth collimator lens 33, a cone prism 34 and a third condensing lens 35, in order to obtain the reflection light R reflected by the object.

The second mirror 31 is provided on the irradiation optical axis Li behind the objective lens group 26 (on the side where the double-sided mirror 30 is located). The second mirror 31 is provided such that a flat reflection face 31a becomes orthogonal to the irradiation light axis Li, and reflects the reflection light R of the reduced light beam in which the beam diameter is reduced by the object lens group 26 toward the second reflection face 30b of the double-sided mirror 30. Therefore, the diameter of the second mirror 31 is set to be smaller than the diameter of the objective lens group 26 and to be larger than the diameter of the double-sided mirror 30. In addition, in the present embodiment, an after-described half mirror for forming a collimation optical system is used for the second mirror 31. The reflection light R reflected by this second reflection face 30b is guided to the third mirror 32. In the present embodiment, the (back) focal point of the objective lens group 26 is located between the second reflection face 30b and the third mirror 32, and the fourth collimator lens 33 is a convex lens.

The third mirror 32 reflects the reflection light R reflected by the second reflection face 30b of the double-sided mirror 30 toward the fourth collimator lens 33. The direction in which the reflection light R travels after being reflected by the second reflection face 30b and the axis line of the fourth collimator lens 33 are the reflection optical axis Lr'. The cone prism 34 and the third condensing lens 35 are provided on this reflection optical axis Lr'. The incident end face 14b of the light-receiving optical fiber 14 is disposed in the extended position of the reflection optical axis Lr'.

The fourth collimator lens 33 converts the entered reflection light R into a light beam parallel to the reflection optical axis Lr'. Accordingly, the fourth collimator lens 33 functions as a reflection light collimator optical member in the optical path forming optical system 12. The reflection light R converted into the parallel light beam enters onto a convex side end face 34a of the cone prism 34, and emits the reflection light R as the parallel light beam having a reduced diameter from a concave side end face 34b along the reflection light axis Lr' (refer to FIG. 2). As illustrated in FIG. 2, the cone prism 34 includes a rotationally symmetric circular cylindrical shape having the reflection optical axis Lr' as a symmetrical axis. The convex side end face 34a located on the fourth collimator lens 33 side is a conical shape which projects to the fourth collimator lens 33 side. The concave side end face 34b located on the third condensing lens 35 side is a conical shape which has a concave shape on the third condensing lens 35 side (refer to FIG. 1). In addition, in the cone prism 34, as seen from the cross-section surface including the reflection optical axis Lr' (symmetrical axis), the convex side end face 34a and the concave side end face 34b are set such that the facing positions in the radial direction with the reflection optical axis Lr' (refer to FIG. 3) at the center become parallel. The function of this cone prism 34 will be described later.

The third condensing lens 35 is provided such that the (back) focal position is located on the incident end face 14b of the light-receiving optical fiber 14 as illustrated in FIG. 1, and condenses the reflection light R of the parallel light beam emitted from the concave side end face 34b of the cone prism 34, so as to be entered on the incident end face 14b of the light-receiving optical fiber 14. Accordingly, the third condensing lens 35 functions as the condensing optical member in the optical path forming optical system 12. As described above, the third condensing lens 35 condenses the reflection light R emitted from the concave side end face 34b, so that the diameter (effective diameter) of the third condensing lens 35 is set to be smaller than the diameter of the fourth collimator lens 33. The reflection light R entered on the incident end face 14b of the receiving optical fiber 14 is guided to the light receiving and emitting mechanism 11 by the light-receiving optical fiber as described above.

The optical path forming optical system 12 includes an imaging lens 36, an imaging element 37, an image processor 38 and a monitor 39, in order to observe the object (not shown). The imaging lens 36 and the imaging element 37 are provided on the irradiation optical axis Li behind the second mirror 31 (on the side opposite to the side where the objective lens group 26 is located). The imaging lens 36 focuses the light (including the reflection light R from the object) which has transmitted the second mirror 31 of the half mirror on the imaging element 37. If the light enters onto the light-receiving surface of the imaging element 37, the imaging element 37 outputs the electric signals according to the light volume to the image processor 38. The image processor 38 generates the image signals by appropriately processing the electric signals output from the imaging element 37, and outputs this image signals to the monitor 39. The monitor 39 displays an image according to the image signals from the image processor 38. Consequently, the irradiation optical axis Li can be easily directed to the object (not shown) if the user of the electric distance meter 10 views the display screen of the monitor 39. The user of the electric distance meter 10 can observe the object (not shown) on the irradiation optical axis Li. Therefore, the objective lens group 26 and the imaging lens 36 function as the collimation optical system. The collimation optical system, the imaging element 37, the image processor 38 and the monitor 39 function as the collimation device.

Accordingly, in the electric distance meter 10, the outgoing light E emitted from the light source 15 of the light receiving and emitting mechanism 11 is guided to the optical path forming optical system 12 by the emission optical fiber 13, and emits the outgoing light E as the parallel light beam on the irradiation optical axis Li via the third collimator lens 27, the expander lens 28, the first mirror 29, the first reflection surface 30a of the double-sided mirror 30 and the objective lens group 26, so that the object (not shown) of a measuring object located on the irradiation optical axis Li can be irradiated by the outgoing light E. Namely, in the optical path forming optical system 12, the emission optical path (emission optical system) is formed by the third collimator lens 27, the expander lens 28 and the first mirror 29 and the double-sided mirror 30.

In this case, the reflection light R from the object (not shown) enters onto the objective lens group 26 as a light beam substantially parallel to the irradiation optical axis Li. In the electric distance meter 10, the reflection light R entered onto the objective lens group 26 enters onto the incident end face 14b of the light-receiving optical fiber 14 via the second mirror 31, the second reflection face 30b of the double-sided mirror 30, the third mirror 32, the fourth collimator lens 33, the cone prism 34 and the third condensing lens 35. More specifically, in the optical path forming optical system 12, the reflection optical path (light-receiving optical system) is formed by the second mirror 31, the double-sided mirror 30, the third mirror 32, the fourth collimator lens 33, the cone prism 34 and the third condensing lens 35.

In this case, in the electric distance meter 10, the diameter of the objective lens group 26 is set to be larger than the diameter of the outgoing light E, and the double-sided mirror 30 is provided on the irradiation optical axis Li behind the objective lens group 26, so that a part of the reflection light R entered onto the objective lens group 26, which corresponds to the central portion of the irradiation optical axis Li provided with the double-sided mirror 30 does not reach the second mirror 31. Namely, the reflection light R to the second mirror 31 does not have a central portion with the irradiation optical axis Li at the center. This reflection light R without having the central portion is reflected by the second mirror 31, the second reflection face 30b of the double-sided mirror 30 and the third mirror 32, and reaches to the fourth collimator lens 33. The reflection light R without having the central portion becomes the parallel light beam along the reflection light axis Lr' by the fourth collimator lens 33. Therefore, the reflection light R entered onto the convex side end face 34a of the cone prism 34 becomes the parallel light beam (refer to Lu1 in FIG. 2) without having the central portion with the reflection optical axis Lr' at the center. The reflection light R of the parallel light beam without having the central portion passes through the cone prism 34 as described later, so that the reflection light R becomes the parallel light beam (refer to Lu2 in FIG. 2) having the central portion, and reaches to the third condensing lens 35.

Figure 4:
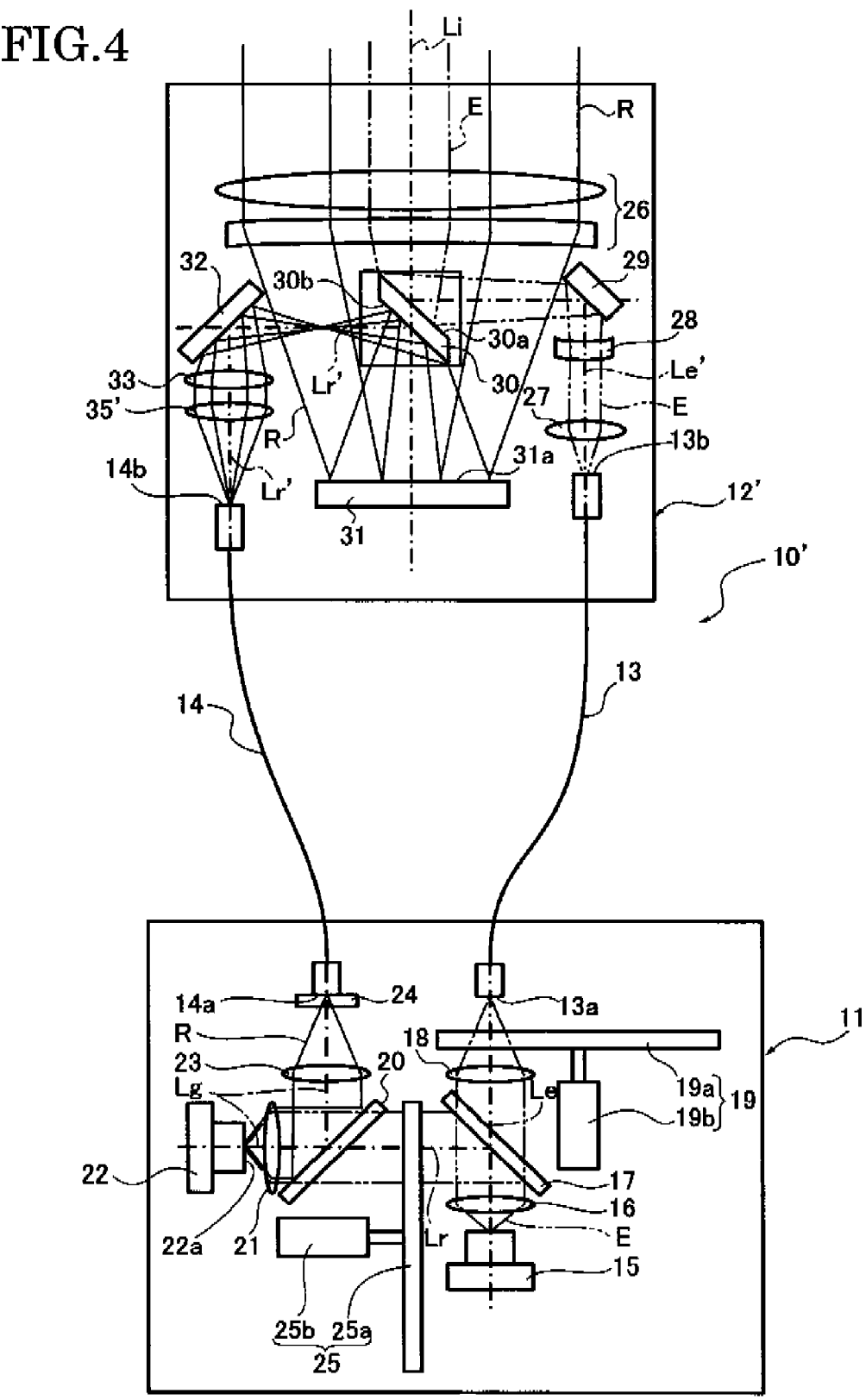
FIG. 4 is a view illustrating one example of an optical path forming optical system of a conventional electric distance meter.

Next, problems of a conventional electric distance meter will be described. FIG. 4 provides a view illustrating one example of an optical path forming optical system 12' of an electric distance meter 10' according to a conventional configuration.

The optical path forming optical system 12' of the electric distance meter 10' has a configuration basically similar to the optical path forming optical system 12 of the electric distance meter 10 according to the present invention except that the cone prism 34 is not provided between the fourth collimator lens 33 and the third condensing lens 35'. Therefore, in the optical path forming optical system 12' illustrated in FIG. 4, reference numbers which are the same as the reference numbers of the optical path forming optical system 12 in FIG. 1 are applied to portions which are the same as those in FIG. 1, so the descriptions thereof will be omitted.

In the optical path forming optical system 12', the reflection light R converted into the parallel light beam along the reflection optical axis Lr' via the fourth collimator lens 33 reaches to the third condensing lens 35'. The reflection light R converted into the parallel light beam is condensed by the third condensing lens 35', and enters onto the incident end face 14b of the light-receiving optical fiber 14. Therefore, the third condensing lens 35' is required to condense the reflection light R of the parallel light beam via the fourth collimator lens 33. For this reason, the diameter (effective diameter) of the third condensing lens 35' is set to be substantially equal to the diameter of the fourth collimator lens 33.

In the optical path forming optical system 12', it is necessary to use the third condensing lens 35' having a large diameter compared to the third condensing lens 35 of the optical path forming optical system 12 of the electric distance meter 10 according to the present invention. This will cause the increase in the size of the electric distance meter 10' and also the increase in the costs.

The third condensing lens 35' condenses the reflection light R via the fourth collimator lens 33 such that the reflection light R enters onto the incident end face 14b of the light-receiving optical fiber 14. In this case, in order to reduce the distance from the third condensing lens 35' to the incident end face 14b of the receiving optical fiber 14, it is necessary to use the third condensing lens 35' having a short focal length, i.e., a large NA (numerical aperture stop). However, in a lens having a large outer diameter (effective diameter), it is difficult to obtain a short focal length, i.e., a large NA (numerical aperture stop). Therefore, in the optical path forming optical system 12', the distance from the third condensing lens 35 to the incident end face 14b of the light-receiving optical fiber 14 is increased compared to the third condensing lens 35 of the optical path forming optical system 12 of the electric distance meter 10 according to the present invention.

Next, the function of the cone prism 34 of the electric distance meter 10 according to the present invention will be described with reference to FIGS. 2 and 3.

The cone prism 34 deflects the traveling direction of the parallel light beam Lu1 without having the central portion with the reflection optical axis Lr' at the center toward the reflection optical axis Lr' in the radius direction centering on the reflection optical axis Lr', so as to convert the parallel light beam Lu1 into the parallel light beam Lu2 having the central portion with the reflection optical axis Lr' at the center. By this function, the outer diameter of the parallel light beam Lu2 emitted from the cone prism 34 becomes smaller than the outer diameter of the parallel light beam Lu1 entered onto the cone prism 34. The light volumes are substantially equal in the vicinity of the cone prism 34.

As illustrated in FIG. 3, the light beam lua parallel to the reflection optical axis Lr' enters into the cone prism 34 via the convex side end face 34a, and travels in the cone prism 34 as the light beam lub. In this case, the convex side end face 34a has a conical shape projecting to the fourth collimator lens 33 side, so that the light beam lub deflects toward the reflection light axis Lr' by the convex side end face 34a. Here, where an angle (incident angle) between the light beam lua and the vertical line p1 orthogonal to the convex side end face 34a is α, and an angle (refraction angle) between the light beam lub and the vertical line p1 is β, incident angle α>refracting angle β is obtained because the cone prism 34 exists in the air.

This light beam lub travels in the cone prism 34 and reaches to the concave side end face 34b. In this cone prism 34, as seen from the cross-sectional surface including the reflection optical axis Lr', as described above, since the convex side end face 34a and the concave side end face 34b are set such that the facing portions in the radial direction with the reflection optical axis Lr' at the center become parallel, the vertical line p1 orthogonal to the convex side end face 34a and the vertical line p2 orthogonal to the concave side end face 34b become parallel. Therefore, the light beam lub enters onto the concave side end face 34b at an angle which is equal to the refraction angle β in the convex side end face 34a. The light beam emitted from the cone prism 34 deflects similar to the case when entering onto the cone prism 34. Accordingly, the light beam lub entered onto the concave side end face 34b at the incident angle β inside the cone prism 34 becomes the light beam luc which is emitted outside the cone prism 34 from the concave side end face 34b at the refraction angle α. In this case, the concave side end face 34b is set to a conical shape having a concave shape on the third condensing lens 35 side, and the light beam lub deflects to separate from the refraction optical axis Lr' by the concave side end face 34b. Therefore, the light beam luc emitted from the concave side end face 34b at the refraction angle α travels parallel to the reflection optical axis Lr'.

The relationship between the emission and incident from and onto the cone prism 34 is constant regardless of the incident position onto the convex side end face 34a, and the light beam entered onto the convex side end face 34a in the direction along the reflection light axis Lr' emits in the direction along the reflection optical axis Lr' from the concave side end face 34b after being deflected to come close to the reflection optical axis Lr'.

In this cone prism 34, the material (refractive index) and the inclination angles of the convex side end face 34a and the concave side end face 34b are set such that the inner end positions i1, i2 (refer to FIG. 3) of the reflection light R (refer to parallel light beam Lu1) without having the central portion entered onto the objective lens group 26, reflected by the second mirror 31, the second reflection face 30b of the double-sided mirror 30 and the third mirror 32 and converted into the parallel light beam by the fourth collimator lens 33 emit to correspond to the substantial reflection optical axis Lr'.

Accordingly, the parallel light beam (refer to Lu1 in FIG. 2) without having the central portion converted into the parallel light beam along the reflection optical axis Lr' by the fourth collimator lens 33 becomes the parallel light beam (refer to Lu2 in FIG. 2) having a small outer diameter and the central portion with the reflection optical axis Lr' at the center by passing through the cone prism 34. The cone prism 34 changes the cross-section shape of the light beam (cross-sectional surface as seen in the direction orthogonal to the traveling direction) at zero of the deflection angle (transmission deflection angle) between the traveling direction of the entering light beam and the traveling direction of the emitting light beam, i.e., without generating a transmission deflection angle.

In the electric distance meter 10 according to the present invention, the following effects (1) to (5) can be obtained.

(1) In the electric distance meter 10, after the parallel light beam (refer to Lu1 in FIG. 2) emitted from the fourth collimator lens 33 is converted into the parallel light beam (refer to Lu2 in FIG. 2) having a small outer diameter by the cone prism 34, the parallel light beam enters onto the third condensing lens 35, so that the outer diameter (effective diameter) of the third condensing lens 35 can be a small diameter (effective diameter). Therefore, compared to the conventional electric distance meter (refer to 10' in FIG. 4), the electric distance meter can be downsized, and the costs can be reduced.

Figure 5:
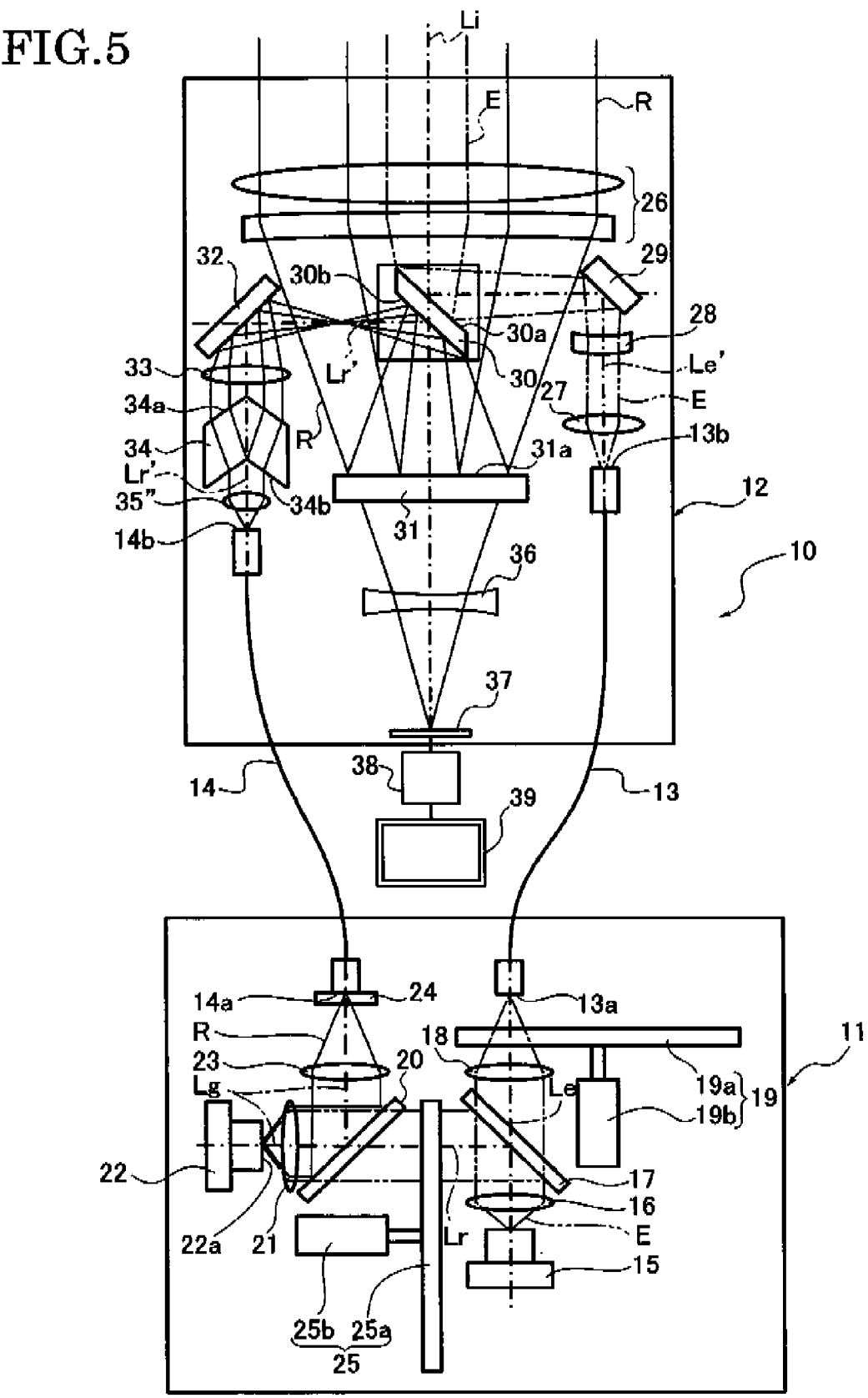
FIG. 5 is a schematic view illustrating an example in which a focal distance of a third condensing lens of an optical path forming optical system in the electric distance meter according to the present invention is reduced.

(2) In the electric distance meter 10, after the parallel light beam (refer to Lu1 in FIG. 2) emitted from the fourth collimator lens 33 is converted into the parallel light beam (refer to Lu2 in FIG. 2) having a small diameter by the cone prism 34, the parallel light beam enters onto the third condensing lens 35. Therefore, as illustrated in FIG. 5, if the third condensing lens 35" having a small outer diameter and an NA (numerical aperture stop) which is equal to that of the third condensing lens (refer to 35' in FIG. 4) of the conventional electric distance meter (refer to 10' in FIG. 4) is used, the distance from the third condensing lens 35" to the incident end face 14b of the light-receiving optical fiber 14 can be reduced compared to the conventional electric distance meter (refer to 10' in FIG. 4).

(3) In the electric distance meter 10, after the parallel light beam (refer to Lu1 in FIG. 2) emitted from the fourth collimator lens 33 is converted into the parallel light beam (refer to Lu2 in FIG. 2) having a small outer diameter by the cone prism 34, the parallel light beam enters onto the third condensing lens 35. Therefore, if the interval from the third condensing lens 35 to the incident end face 14b of the light-receiving optical fiber 14 is set to be similar to that of the conventional electric distance meter (refer to 10' in FIG. 4), the third condensing lens 35 having a small outer diameter (effective diameter) and a long focal length, i.e., a small NA (numerical aperture stop) can be used. Accordingly, the electric distance meter 10 can be downsized because the third condensing lens 35 is downsized, and the costs can be reduced, compared to the conventional electric distance meter (refer to 10' in FIG. 4).

(4) Since the third condensing lens 35 having a small outer diameter (effective diameter) can be used compared to the conventional electric distance meter (refer to 10' in FIG. 4), the diameter of the light-receiving optical fiber 14 can be reduced without reducing a spread angle (later discussion). This will be described hereinbelow with reference to FIG. 6.

Figure 6:
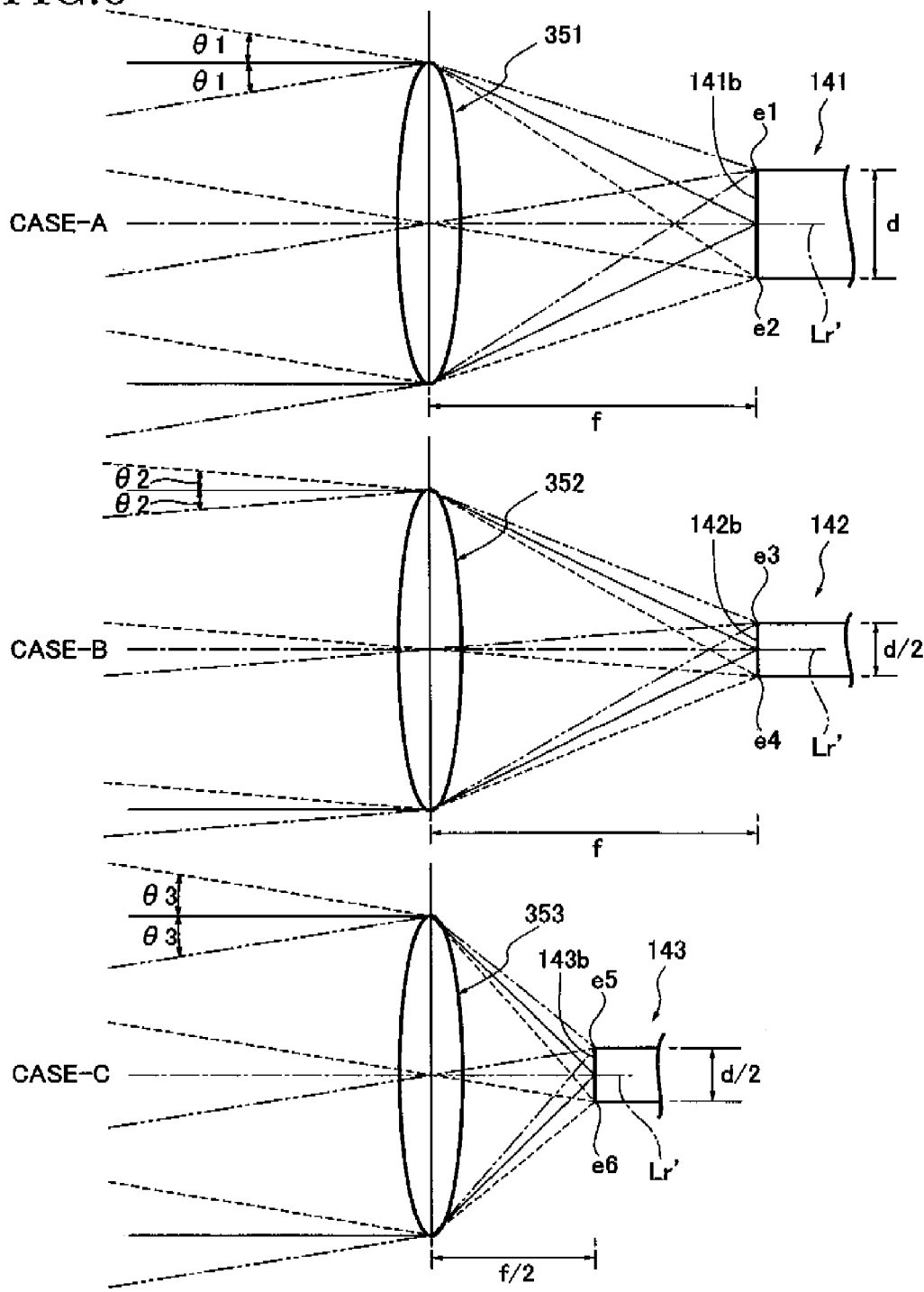
FIG. 6 is a view in which an optical path view is applied to the positional relationship between the third condensing lens and the incident end face b of the light receiving optical fiber; CASE-A illustrates an example in which the (back side) focal length of the third condensing lens is f and the diameter of the light receiving optical fiber is d; CASE-B illustrates an example in which the focal length is f and the diameter is d/2; and CASE-C illustrates an example in which the focal length is f/2 and the diameter is d/2.

FIG. 6 is a view illustrating a relationship between the third condensing lens 35 and the incident end face 14b of the light-receiving optical fiber 14 by an optical view. In FIG. 6 CSAE-A, reference number f denotes a (back) focal length of the third condensing lens 35, and reference number d denotes a diameter of the light-receiving optical fiber 14. In FIG. 6 CASE-B, reference number f denotes a focal length and d/2 denotes a diameter. In FIG. 6 CASE-C, reference number f/2 denotes a focal length and d/2 denotes a diameter.

At first, as illustrated in FIG. 6 CASE-A, the (back) focal length of a third condensing lens 351 is denoted by reference number f, and the third condensing lens 351 and a light-receiving optical fiber 141 are provided such that the center of an incident end face 141b of the light-receiving optical fiber 141 having a diameter d is located in the (back) focal position. In this case, the light-receiving optical fiber 141 has the diameter d, and an upper end position e1 of the incident end face 141b condenses the parallel light beam incident on the third condensing lens 351 at a predetermined angle−θ1 (upper side as seen FIG. 6 from the front is +) relative to the reflection optical axis Lr'. Similarly, a lower end position e2 condenses the parallel light incident on the third condensing lens 351 at a predetermined angle+θ1 relative to the reflection optical axis Lr'. For this reason, the parallel light having an angle θ1 enters onto each of the upper side and the lower side of the incident end face 141b of the light-receiving optical fiber 141 with the reflection optical axis Lr' at the center. The angle in which the upper side angle and the lower side angle are combined is the spread angle, and in the example illustrated in FIG. 6 CASE-A, the spread angle is 2θ1.

In this case, as illustrated in FIG. 6 CASE-B, if a third condensing lens 352 similar to that in FIG. 6 CASE-A is used, and a light-receiving optical fiber 142 having a diameter d/2 is used, the diameter of an incident end face 142b becomes smaller than the incident end face 141b in FIG. 6 CASE-A, so that the angle θ2 incident on each of the upper position e3 and the lower position e4 becomes smaller than the angle θ1 in FIG. 6 CASE-B. For this reason, in the example illustrated in FIG. 6 CASE-B, the spread angle 2θ2 becomes smaller than the spread angle 2θ1 in FIG. 6 CASE-A.

In this case, as illustrated in FIG. 6 CASE-C, if a light-receiving optical fiber 143 having the diameter d/2 similar to that in FIG. 6 CASE-B is used, and a third condensing lens 353 having the (back) focal length f/2 is used, the angle θ3 incident on each of the upper end position e5 and the lower end position e6 becomes equal to the angle θ1 in FIG. 6 CASE-A. For this reason, in the example illustrated in FIG. 6 CASE-C, the spread angle 2θ3=2θ1 is obtained, which is the same spread angle in FIG. 6 CASE-A.

As described above, in a small diameter lens (effective diameter), the focal length can be easily reduced compared to a large diameter lens (effective diameter). In the electric distance meter 10 of the present invention, the third condensing lens 35 having a small diameter (effective diameter) can be used, so that the focal length can be easily reduced, compared to the conventional electric distance meter (refer to 10' in FIG. 4). Accordingly, the diameter of the light-receiving optical fiber 14 can be reduced without reducing the spread angle relative to the light-receiving optical fiber 14.

In the light-receiving optical fiber 14 having a small diameter, the volume can be reduced compared to an optical fiber having a large diameter, so that the occupied area can be reduced, and the curvature when curving can be increased. For this reason, the handling ability can be significantly improved. Accordingly, in addition to the use of the third condensing lens 35 having a small outer diameter (effective diameter), the occupied area of the light-receiving optical fiber 14 can be reduced, and the handing ability can be significantly improved, so that the size of the electric distance meter can be significantly reduced compared to the conventional electric distance meter (refer to 10' in FIG. 4).

(5) The parallel light beam (refer to Lu1 in FIG. 2) without having the central portion, which is converted into the parallel light beam along the reflection optical axis Lr' by the fourth collimator lens 33 passes through the cone prism 34, so that the parallel light beam is converted into the parallel light beam (refer to Lu2 in FIG. 2) having a small outer diameter and the central portion with the reflection optical axis Lr' at the center. Therefore, the reflection light R having the central portion can be received by the incident end face 14b of the receiving optical fiber 14, i.e., the light-receiving element 22 of the light receiving and emitting mechanism 11.

(6) The cone prism 34 which converts the reflection light converted into the parallel light beam without having the central portion is converted into the parallel light beam having the central portion by deflecting the reflection light on the optical axis side in the radial direction includes the rotationally symmetric cylindrical shape having the reflection optical axis Lr' as a symmetrical axis in whole, the convex side end face 34a located on the forth collimator lens 33 side includes the conical shape projecting on the fourth collimator lens 33 side, and the concave side end face 34b located on the third condensing lens 35 side includes the conical shape having the concave shape on the third condensing lens 35 side, and the convex side end face 34a and the concave side end face 34b facing each other in the radial direction with the reflection optical axis Lr' at the center are made of a single optical member such that the convex side end face 34a and the concave side end face 34b are set to be parallel to each other. Accordingly, the cone prism 34 can be easily formed, and the size can be easily reduced. Moreover, since the incident light beam to the cone prism 34 and the outgoing light beam from the cone prism 34 are converted into the parallel light beams (refer to Lu1 and Lu2 in FIG. 2), respectively, the fourth collimator lens 33 and the third condensing lens 35 can be provided on the reflection optical axis Lr' such that the distance therebetween is reduced. Therefore, the optical path forming optical system 12 can be reduced; thus, the entire electric distance meter can be easily downsized.

As described above, in the electric distance meter 10 according to the present invention, the third condensing lens 35 having a small outer diameter (effective diameter) can be used. In addition, in the lens having a small outer diameter (effective diameter), the focal length can be easily reduced, so that the diameter of the light-receiving optical fiber 14 can be reduced without reducing the spread angle to the light-receiving optical fiber 14. The electric distance meter 10 can be thereby downsized.

Second Embodiment

In the first embodiment, in the optical path forming optical system 12, the emission end face 13b of the emitting optical fiber 13 connected to the light receiving and emitting mechanism 11 faces the third collimator lens 27, and the incident end face 14b of the light-receiving optical fiber 14 faces the third condensing lens 35, namely, the third collimator lens 27 side is the emission side and the third condensing lens 35 side is the light-receiving side; however, both of them can be interchanged.

In this second embodiment, an electric distance meter 100 will be described in which the emission end face 13b of the emitting optical fiber 13 faces the third condensing lens 35, and the incident end face 14b of the light-receiving optical fiber 14 faces the third collimator lens 27, the third condensing lens 35 side is the emission side and the third collimator lens 27 side is the light-receiving side (refer to the emitting optical fiber 13 and the light-receiving optical fiber 14 illustrated in the dotted line in FIG. 1).

Since this electric distance meter 100 is similar to the electric distance meter 10 of the first embodiment except for the connection relationship of the emitting optical fiber 13 and the light-receiving optical fiber 14 as described above, the same reference numbers are applied to the same configurations, and the description thereof will be omitted. Moreover, since the electric distance meter 100 is similar to the electric distance meter 10 of the first embodiment except for the connection relationship of the emitting optical fiber 13 and the light-receiving optical fiber 14, the operation in the light receiving and emitting optical mechanism 11 is similar to that in the electric distance meter 10, and the operation in the optical path forming optical system 12 draws an optical path view similar to that in the electric distance meter 100 except that the light traveling direction becomes reversed by the reversing property of light. Therefore, in the electric distance meter 100, reference number R in FIG. 1 corresponds to the outgoing light and reference number E in FIG. 1 corresponds to the reflection light. Hereinafter, the outgoing light (R) and the reflection light (E) are described. In the electric distance meter 100, the third condensing lens 35 functions as an outgoing light collimator optical member which converts the outgoing light (R) in the optical path forming optical system 12.

In the electric distance meter 100, the outgoing light (R) emitted from the light source 15 of the light receiving and emitting mechanism 11 is guided to the optical path forming optical system 12 by the emitting optical fiber 13. Then, the outgoing light (R) is emitted as the parallel light beam on the irradiation optical axis Li from the objective lens group 26 via the third condensing lens 35, the cone prism 34, the fourth collimator lens 33, the third mirror 32, the second reflection face 30bo of the double-sided mirror 30 and the second mirror 31. Therefore, in the optical path forming optical system 12 of the electric distance meter 100, the emission optical path is formed by the third condensing lens 35, the cone prism 34, the fourth collimator lens 33, the third mirror 32, the both-sided mirror 30 and the second mirror 31.

As described above, in the electric distance meter 100, the object (not shown) of the measuring object located on the irradiation optical path Li can be irradiated. If the distance from the electric distance meter 100 to the object (not shown) is large (the interval is significantly large to the optical system), the reflection light (E) from the object enters onto the objective lens group 26 as the light beam substantially parallel to the irradiation optical path Li.

In the electric distance meter 100, a part of the reflection light (E) entered onto the objective lens group 26, which has reached the first reflection face 30a of the double-sided mirror 30 is reflected to the first mirror 29, and is entered onto the incident end face 14b of the light-receiving optical fiber 14 via the expander lens 28 and the third collimator lens 27. Consequently, in the optical path forming optical system 12 of the electric distance meter 100, the reflection optical path is formed by the double-sided mirror 30, the first mirror 29, the expander lens 28 and the third collimator lens 27.

Accordingly, in the electric distance meter 100, by detecting the phase difference between the outgoing light (R) emitted from the light source 15 and received by the light-receiving element 22 and the reflection light (E) received by the light-receiving element 22 via the optical path forming optical system 12 and the initial phase of the outgoing light (R), or the time difference from the emitting of the emission light (R) to the receiving of the reflection light (E), the distance from the electric distance meter 100 to the object (not shown) is calculated by the calculator (not shown).

In the electric distance meter 100, the effects which are similar to those in the electric distance meter 10 can be obtained. Namely, a small outer diameter (effective diameter) of the third condensing lens 35 (outgoing light collimator optical member) can be obtained (the above-described effect (1)), the distance between the third condensing lens 35 and the emission end face 13b of the emitting optical fiber 13 can be reduced by using the third condensing lens 35 having an NA (numerical aperture stop) which is similar to the case when the cone prism 34 is not used (the above-described effect (2)), the third condensing lens 35 having a small diameter (effective diameter) and a long focal length, i.e., a small NA (numerical aperture stop) can be used if the distance between the third condensing lens 35 and the emitting optical fiber 13 is set to be similar to the case when the cone prism is not used (the above-described effect (3)), the diameter of the emitting optical fiber 13 can be reduced without reducing the spread angle (the above-described effect (4)), and the cone prism 34 can be easily formed and the size can be easily reduced (the above-described effect (6)). In addition, the effects associated with those effects can be similarly obtained.

Moreover, in the electric distance meter 100, the outgoing light (R) emitted from the emission end face 13b of the emitting optical fiber 13 is converted into the parallel light beam along the outgoing optical axis (refer to Lr'), and then is converted into the parallel light beam (refer to Lu1 in FIG. 2) without having the central portion. The outgoing light (R) without having the central portion is guided to the objective lens group 26 via the fourth collimator lens 33, the third mirror 32, the second reflection face 30b of the double-sided mirror 30 and the second mirror 31. Therefore, the double-sided mirror 30 exists in the optical path from the second mirror 31 to the objective lens group 26, but the outgoing light (R) which passes through this optical path does not have the central portion by the cone prism 34, and the double-sided mirror 30 is located in the position without having this central portion. Thereby, in the electric distance meter 100, the outgoing light (R) emitted from the light source 15 is not kicked by the double-sided mirror 30 (the emission from the objective lens group 26 is not shielded by the double-sided mirror 30), so that the volume of the outgoing light (R) emitted from the light source 15 can be effectively used. When the light source 15 is constituted by the pulse laser diode (laser emission device) as described in the present embodiment, the light intensity distribution of the outgoing light is Gauss distribution. For this reason, it is especially effective to remove the kicking of the central portion about the optical axis in the outgoing light in view of effectively using the light volume.

In the first embodiment, although the light receiving and emitting mechanism 11 is constituted as illustrated in FIG. 1, the mechanism 11 is not limited to the first embodiment as long as the outgoing light E is emitted from the light source 15 and the reflection light R is received by the light-receiving element 22 (light-receiving portion) in order to measure the phase difference and/or the time difference from the emitting of the outgoing light E to the receiving of the reflection light R.

In the first embodiment, the optical path forming optical system 12 is constituted as illustrated in FIG. 1, but the optical path forming optical system 12 is not limited to the first embodiment as long as the emission optical path which emits the outgoing light E from the objective lens group 26 on the irradiation optical axis Li toward the object (not shown) is formed and the reflection optical path which obtains the reflection light R from the object entered onto the objective lens group 26 in a state circularly surrounding the outgoing light E. This is the same as the case when the light traveling direction becomes reversed by interchanging the emission side and the reflection side in the optical path forming optical system 12 (when the outgoing light E and the reflection light R are interchanged (second embodiment)).

In the first embodiment, the cone prism 34 includes the rotationally symmetric cylinder shape having the reflection optical axis Lr' as the symmetrical axis in whole, the convex side end face 34a located on the fourth collimator lens 33 side includes the conical shape projecting to the fourth collimator lens 33 side, and the concave side end face 34b located on the third condensing lens 35 side includes the conical shape having the concave shape on the third condensing lens 35 side, and the convex side end face 34a and the concave side end face 34b facing each other become parallel to each other in the radial direction with the reflection optical axis Lr' (symmetrical axis) at the center. However, these are not limited to the shapes described in the first embodiment as long as it can change the cross section shape of the light beam without generating a transmittance deflection angle (cross section as seen in the direction orthogonal to the traveling direction), preferably, the reflection light converted into the parallel light beam without having the central portion is converted into the parallel light beam having the central portion by deflecting the reflection light on the optical axis side in the radial direction.

Although the electric distance meter of the present invention has been described based on the above embodiments, the present invention is not limited thereto. It should be appreciated that variations may be made in the embodiments described by persons skilled in the art without departing from the scope of the present invention.

The invention claimed is:

1. An electric distance meter, which emits outgoing light from a light source toward an object through an objective lens, and comprises a distance measuring optical system which measures a distance by receiving reflection light of the outgoing light from the object by a light receiver through the objective lens, the distance measuring optical system including:
  a condensing optical member configured to condense the reflection light from the objective lens;
  a light-receiving optical fiber configured to guide the reflection light from the condensing optical member to the light receiver in an optical path from the objective lens to the light receiver; and
  a cone prism configured to change a cross-section shape of a light beam and reduce an outer diameter of the light beam without generating a transmission deflection angle, and collect an inner part of annular light on an apex of a cone disposed at an outgoing side of the cone prism, the cone prism being provided between the objective lens and the condensing optical member.

2. The electric distance meter according to claim 1, wherein an incident end surface of the light-receiving optical fiber is located in a focal position of the condensing optical member in the distance measuring optical system.

3. The electric distance meter according to claim 1, further comprising a collimation optical system which divides a part of the reflected light from the distance measuring optical system by an optical path dividing optical member.

4. The electric distance meter according to claim 1, wherein the distance measuring optical system is provided with a reflection optical member in which a first reflection surface which reflects the outgoing light toward the object and a second reflection surface which reflects the reflection light toward the light receiver are integrally formed, the reflection optical member being provided in a back portion of the objective lens which is on a side of the objective lens opposite to the object.

5. The electric distance meter according to claim 4, further comprising a collimation optical system which divides a part of the reflected light from the distance measuring optical system by an optical path dividing optical member, wherein:
  the distance measuring optical system is provided with the optical path dividing optical member in a back portion of the reflection optical member; and
  the optical path dividing optical member guides a part of the reflected light to the second reflection surface of the optical member, and guides another part of the reflected light to the collimation optical system.

6. An electric distance meter that emits outgoing light from a light source on an irradiation optical path toward an object through an objective lens, the electric distance meter comprising a distance measuring optical system which receives reflection light from the object entered onto the objective lens by a light receiver in a state in which the reflection light circularly surrounds the outgoing light, and measures a distance based on the reflection light and the outgoing light in the distance measuring optical system, the distance measuring optical system including:
  a reflection light collimator optical member configured to convert the reflection light into a substantially parallel light beam;
  a condensing optical member configured to condense the reflection light from the reflection light collimator optical member;
  a light receiving optical fiber configured to guide the reflection light from the condensing optical member to the light receiver in an optical path from the objective lens to the light receiver; and
  a cone prism configured to convert the reflection light without having a central portion, which is converted into the substantially parallel light beam by the reflection light collimator optical member, into a parallel light beam having the central portion by changing a cross-section shape of the substantially parallel light beam while reducing an outer diameter of the substantially parallel light beam without generating a transmission deflection angle, the cone prism being provided between the reflection light collimator optical member and the condensing optical member.

7. The electric distance meter according to claim 6, wherein the cone prism has a rotationally symmetric cylindrical shape having an optical axis from the reflection light collimator optical member to the condensing optical member as a symmetrical axis, an end face of the cone prism located on the reflection light collimator optical member side includes a conical shape projecting toward the reflection light collimator optical member, an end face of the cone prism located on the condensing optical member side includes a conical shape having a concave shape with respect to the condensing optical member, and facing portions of the end face located on the condensing optical member side and the end face located on the reflection light collimator optical member side in a radial direction with the symmetrical axis at the center are parallel.

8. An electric distance meter comprising:
a distance measuring optical system including:
- a light receiving and emitting mechanism configured to emit light from a light source and receive light by a light receiver;
- an optical path forming optical system configured to form an emission optical path which emits outgoing light from the light receiving and emitting mechanism from an objective lens on an irradiation optical axis toward the object and form a reflection optical path which guides reflection light of the outgoing light from the object to the light receiving and emitting mechanism in a state in which the reflection light does not have a central portion and circularly surrounds the outgoing light;
- an emitting optical fiber configured to connect the light receiving and emitting mechanism and the optical path forming optical system, and guide the outgoing light emitted from the light receiving and emitting mechanism to the emission optical path of the optical path forming optical system;
- a light-receiving optical fiber configured to connect the light receiving and emitting mechanism and the optical path forming optical system, and guide the reflection light from the reflection optical path of the optical path forming optical system to the light receiver of the light receiving and emitting mechanism, the reflection optical path of the distance measuring optical system including:
  - a reflection light collimator optical member configured to convert the reflection light into a substantially parallel light beam and
  - a condensing optical member configured to condense the reflection light from the reflection light collimator optical member so as to direct the reflection light onto an incident end surface of the light-receiving optical fiber; and
- a cone prism configured to change a cross-section shape of a light beam and reduce an outer diameter of the light beam without generating a transmission deflection angle, and collect an inner part of annular light on an apex of a cone disposed at an outgoing side of the cone prism, the cone prism being provided between the reflection light collimator optical member and the condensing optical member.

9. The electric distance meter according to claim 8, wherein the cone prism converts the reflection light without having a central portion, which is converted into the substantially parallel light beam via the reflection light collimator optical member, into a parallel light beam having the central portion by refracting the reflection light without having the central portion on an optical axis side in a radial direction.

* * * * *

UNITED STATES PATENT AND TRADEMARK OFFICE
CERTIFICATE OF CORRECTION

PATENT NO.       : 8,917,382 B2
APPLICATION NO.  : 13/122200
DATED            : December 23, 2014
INVENTOR(S)      : Kunihiro Hayashi Page 1 of 1

It is certified that error appears in the above-identified patent and that said Letters Patent is hereby corrected as shown below:

In the Specification

In column 2, line 51: change "in a sate without having" to --in a state without having--.

Signed and Sealed this
Ninth Day of June, 2015

Michelle K. Lee
*Director of the United States Patent and Trademark Office*